3,006,779
CONTINUOUS CALCIUM CARBONATE SLURRY PROCESS

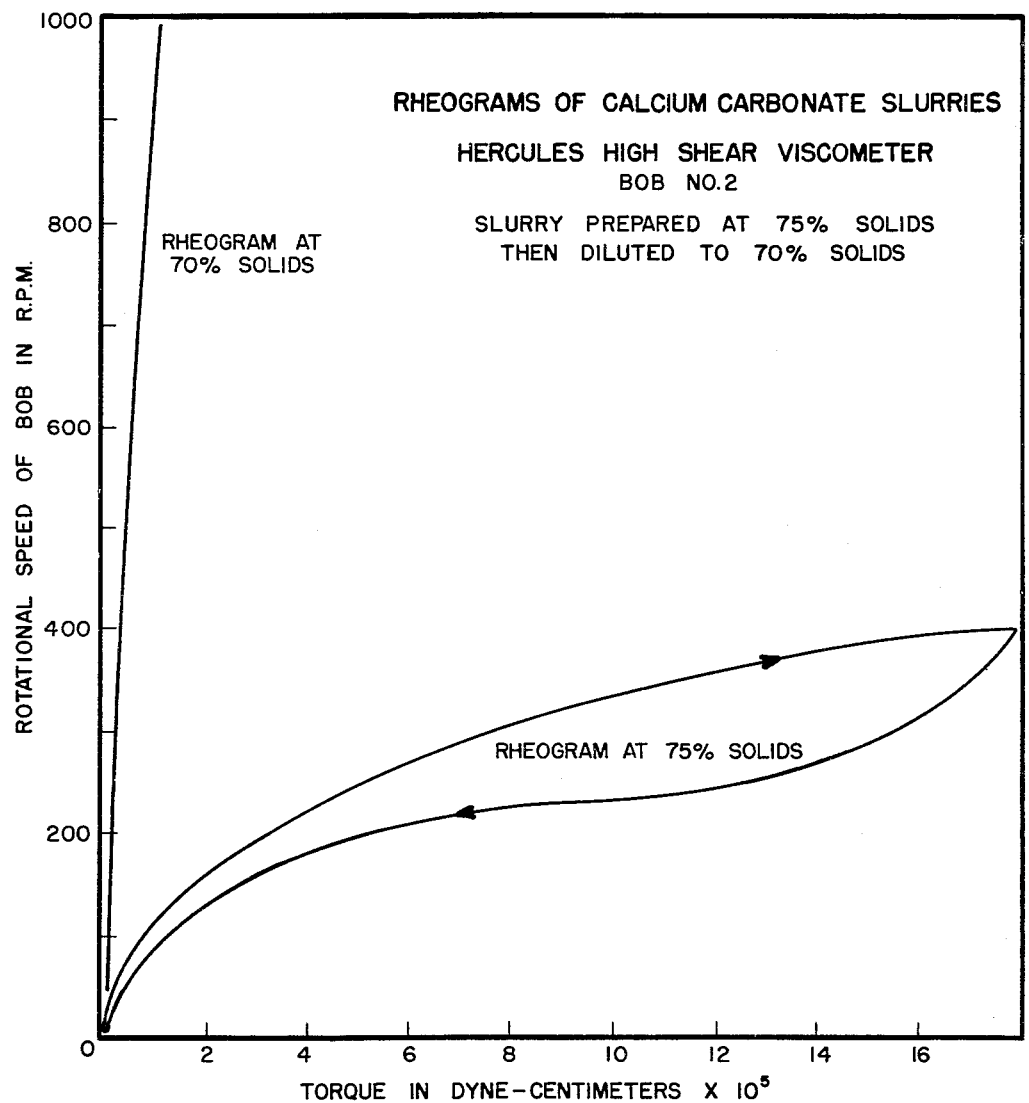

Clyde W. Leaf, Trenton, George E. Hall, Jr., Wyandotte, and Irwin A. Davis, Oak Park, Mich., assignors to Wyandotte Chemicals Corporation, Wyandotte, Mich., a corporation of Michigan
Filed Jan. 9, 1959, Ser. No. 785,866
9 Claims. (Cl. 106—306)

This invention relates to paper coatings and to calcium carbonate slurries which are useful in preparing such coatings. More particularly, it relates to a continuous process for preparing high solids, low viscosity slurries of calcium carbonate.

Inorganic paper coatings are compositions of pigments and adhesives, suspended in water, which are applied to one or both sides of paper by special apparatus to make it more suitable for printing or to improve its decorative quality. In addition to the pigments and adhesives, the paper coating may contain a variety of adjuncts such as waxes, water-proofing agents, plasticizers, defoamers, wetting agents, dispersants and antiseptics.

The pigments which can be employed in inorganic coating formulations include, for example, white minerals such as clay, barites, talc and ground limestone; colored pigments such as ultramarine, umber, siennas, ochers and lakes; powdered metals such as tin, zinc, bronze and aluminum; and synthetic pigments such as titanium dioxide, satin white, blanc fixe and precipitated calcium carbonate. The adhesives which are conventionally employed in paper coatings include glue, casein, soybean protein, starch, hydroxyethyl cellulose and synthetic polymers such as 50–50 butadiene-styrene copolymer.

There are two general methods for applying the coating to the surface of the paper. One procedure for coating paper is known as "conversion" coating and the other paper coating technique is called "on-machine-coating." The coating color, which is employed in the conversion coating process, can be prepared by dissolving the adhesive at elevated temperature in water, preparing the pigment slurry, blending the adhesive into the pigment slurry and subsequently screening the coating color in order to remove undissolved particles and foreign matter. After screening, the coating color is applied to the paper by an apparatus known as the roll coater which employs brushes or reverse-turning rolls for after-smoothing the color on the paper. A cast coater, if used, dries and burnishes the paper in one operation. In the conversion coating process, the coating is applied after the paper is manufactured.

In the on-machine-coating method, which is a more recent development in the paper industry, the coating color is applied to one or both sides of the paper as it is being made, dried and passed through the paper making machine. Paper color formulations for use in the on-machine-coating method can be prepared by several methods. In one method, dry modified starch is added to a pigment slip or pigment slurry contained in a jacketed heavy-duty dough mixer equipped with sigma blades and the mixture is heated to about 200° F. to gelatinize the starch. The color is then cooled, passed through a dispenser or colloid mill, screened and subsequently pumped to the coater.

The coating colors, whether for use in the conversion process or in the on-machine-coating method, are, in general, thixotropic and tend to set rigidly upon being applied to the surface of the paper. After the coating color has been applied to the paper, the paper is dried in a suitable manner wherein the water from the coating formulation is evaporated. A critical feature of each coating formulation is, therefore, the ratio of solids to water. Thus, a high solids content is particularly desirable in order to reduce the amount of water which must be evaporated. A reduction in the water content of the coating color is of further significance in that it reduces the cost of the coating step as well as permitting a more rapid coating operation. Although a high solids-low water ratio is particularly advantageous in a paper coating formulation, the viscosity of the coating color must be low enough so that it can be handled easily with respect to pumping, flow and ease of application onto the paper.

Precipitated calcium carbonate is one of the principal synthetic pigments employed in paper coatings. It would be a significant advantage to prepare a high solids, low viscosity slurry of calcium carbonate which could be subsequently blended with an adhesive and other suitable adjuncts so as to provide a high solids paper coating having a low viscosity. Heretofore, high solids pigment slurries such as calcium carbonate slurries for use in paper coatings have had relatively high viscosity and, therefore, required the use of a heavy-duty dough mixer of the sigma blade type for their preparation. This viscosity factor is a significant limitation in preparing paper coatings having a high solids content.

An object of this invention is, therefore, to provide a process for preparing a high solids calcium carbonate slurry which, in turn, permits the preparation of paper coating colors having high solids content.

Another object of this invention is to provide a process for preparing calcium carbonate slurries which, in addition to having a high solids content, also have a low viscosity.

A further object of this invention is to provide a continuous process for preparing high solids, low viscosity calcium carbonate slurries.

A still further object of this invention is to provide an economical process for preparing slurries of calcium carbonate which, in addition to having high solids and low viscosity, also have good storage stability.

A still further object of this invention is to provide a continuous process for preparing a high solids, low viscosity slurry of calcium carbonate, which slurry when slightly reduced in solids content by dilution with water has a viscosity which is significantly less than a slurry prepared directly at the reduced solids content.

Other objects will be apparent as this specification proceeds.

In accordance with this invention, a continuous process is provided for preparing a high solids, low viscosity slurry of calcium carbonate, which comprises: adding about 70–78 percent by weight of calcium carbonate, about 0.4–2.0 percent by weight of dispersant and about 22–30 percent by weight of water simultaneously to a body of slurry containing about 70–78 percent by weight of calcium carbonate and about 0.4–2.0 percent by weight of dispersant and passing the mixture through at least one hydraulic attrition zone imparting intense turbulence, high kinetic energy and a velocity of at least about 1500 feet/minute to the slurry in said zone relative to the body of slurry and continuously removing therefrom a high solids, low viscosity slurry of calcium carbonate, said process being carried out at about ambient temperatures and at such rate as to maintain the body of slurry at approximately constant volume; the calcium carbonate being characterized in that it is a finely divided, relatively nonaggregated calcium carbonate having an apparent particle size within the range of about 0.05–0.30 micron as determined by electron micrographs; and the dispersant consisting of a homogeneous mixture of sodium phosphate glass, zinc oxide and a potassium or lithium salt or hydroxide wherein the concentration of the dispersant is based upon the dry weight of calcium carbonate.

We have found that one particular type of calcium carbonate is especially suitable for preparing high solids, low viscosity slurries of calcium carbonate. This calcium carbonate is characterized in that it is a finely divided, relatively nonaggregated calcium carbonate having an apparent particle size within the range of about 0.05–0.30 micron as determined by electron micrographs and can be prepared in accordance with the method set forth in U.S. Patent application Serial No. 731,847—G. E. Hall. In accordance with the disclosure of Hall, finely divided, nonaggregated crystals of calcium carbonate can be prepared by gradually contacting calcium ions with carbonate ions in an aqueous medium at a pH of at least about 8.5, and in the presence of anti-compositing forces of sufficient intensity and magnitude to establish and maintain substantially all of the crystals of calcium carbonate resulting from the contacting step in a completely segregated condition. The resulting calcium carbonate slurry is removed from the reaction zone, washed to an essentially salt-free condition, dried and then crushed.

Since anti-compositing forces of sufficient intensity and magnitude to establish and maintain the crystals of calcium carbonate in a state of segregation are necessary, the precipitation step is, in accordance with the Hall disclosure, carried out in the presence of an apparatus which comprises two parallel and relatively rotatable discs, two shafts, the discs forming a central chamber between them and being centrally secured to the shaft, one of the shafts being tubular and having arranged within, and serving as a bearing for the other shaft, a centrifugal pump arranged in the chamber and including propeller blades extending substantially radially and carried by one of the shafts, the propeller blades terminating at a distance from the circumferences of the discs, the discs being provided on their inner faces outside the centrifugal pump area with spaced concentric rows of spacedly and circularly arranged teeth, the teeth of either disc between the teeth of the outermost and innermost rows projecting into the spaces between the adjacent rows of teeth of the other disc, the teeth being shaped and arranged to form material-impacting flanks extending generally radially, the spaces between the teeth of the outermost row forming material discharge openings around the entire periphery of the device. This apparatus is more fully described in U.S. Patent No. 2,619,330—P. Willems. The differential peripheral speed between the discs, when in operation, is at least about 1160 feet/minute. The maximum ratio of the diameter of the cylindrical reaction zone to the outside diameter of the inner disc is about 6:1 and the ratio of the pumping rate in gallons per minute of the centrifugal pump to the quantity in gallons of slurry in the field is at least 3:1.

The term "calcium carbonate" as used herein and in the claims refers to the finely divided, relatively non-aggregated calcium carbonate which is prepared in accordance with the method disclosed by Hall and which has an apparent particle size within the range of about 0.05–0.30 micron as determined by electron micrographs. In a preferred form, at least about one-half of the calcium carbonate particles have an apparent particle size within the range of about 0.10–0.20 micron as determined from electron micrographs.

The dispersant which can be effectively employed in the method of the invention is essentially a three-phase, homogeneous fused product comprising from about 81–88 percent by weight of sodium phosphate glass having a molar ratio of sodium oxide to phosphorous pentoxide from about 0.9:1 to about 1.5:1, from about 10–15 percent by weight of zinc oxide and from about 0.5–8.0 percent by weight of a compound selected from the group consisting of the salt and hydroxide of an alkali metal selected from the group consisting of potassium and lithium. The preferred sodium phosphate glass is modified sodium hexametaphosphate which has a molar ratio of sodium oxide to phosphoric pentoxide of 1.1:1. The potassium and lithium salts which can be fused into, or mechanically admixed with, a sodium metaphosphate-zinc oxide glass in order to prepare suitable dispersants include, for example, lithium or potassium metaphosphate or lithium or potassium carbonate. A preferred dispersant contains 83.5% by weight of sodium hexametaphosphate, about 11.5% by weight of zinc oxide and about 5% by weight of potassium metaphosphate. Dispersants containing the above ingredients in the proportions set forth are marketed under the trademark Calgon T and are more fully described in U.S. Patent No. 2,750,299—G. D. Hansen, Jr. The concentration of the dispersant employed in the method of the invention is based upon the dry weight of calcium carbonate.

In carrying out the method of the invention, a high solids slurry of calcium carbonate is initially prepared by slowly adding calcium carbonate to an aqueous solution of dispersant in a vessel equipped with a suitable agitator. The amount of calcium carbonate added to the aqueous solution of dispersant under agitation is such as to provide a slurry containing from about 70–78 percent by weight of calcium carbonate. The amount of dispersant in this slurry is in the range of 0.4–2.0 percent by weight based upon the weight of the dry calcium carbonate. The agitator which can be employed to prepare the initial high solids calcium carbonate slurry is a Cowles dissolver. This agitator, by employing circular impeller discs rotating at high peripheral velocities of the order of at least about 1500 feet/minute up to about 15,000 feet/minute and submerged in the slurry, establishes a hydraulic attrition zone in the body of slurry. Although one rotating disc establishes a hydraulic attrition zone and gives good results, it is preferable to employ at least two rotating discs and thereby establish two contiguous hydraulic attrition zones. The impeller discs preferably should have a multiplicity of suitably raised veins or depressed grooves, forming a symmetrical radial or arcuate pattern of alternate raised and lowered portions around the impeller discs. Another suitable design embodies a multipliicty of raised veins with inclined knife edges set obliquely in a symmetrical pattern around the periphery of the impeller discs. The submerged impeller discs rotating at high peripheral speed in the slurry create or establish an efficient hydraulic attrition zone within the slurry immediately adjacent to the surface of the rapidly rotating impeller discs. The hydraulic attrition zone imparts intense turbulence, high kinetic energy and a velocity of at least about 1500 feet/minute to the slurry in the zone relative to the body of the slurry. Additionally, the rapidly rotating impeller disc sets up a rapid and efficient vortical circulation of the entire slurry body so that successive portions of the slurry are drawn repeatedly into and through the hydraulic attrition zone.

The impeller disc should be rotated at a rate sufficient to discharge the slurry at the rim of the impeller at a velocity of at least 1500 feet/minute and, preferably, at a velocity in the range of about 2000 to about 2500 feet/minute.

About 70–78 percent by weight of calcium carbonate, about 0.4–2.0 percent by weight of dispersant, based upon the weight of the dry calcium carbonate, and about 22–30 percent by weight of water are continuously and simultaneously metered into the vortical zone created by the disc-type agitator in the initially prepared high solids calcium carbonate slurry. The dispersant is dissolved in water and the solution metered into the vortical zone. Due to the vortical action of the rapidly rotating impeller discs, the calcium carbonate, water and dispersant are drawn into the hydraulic attrition zone which is immediately adjacent to the rotating discs. The calcium carbonate is dispersed in this zone and is subsequently withdrawn through a suitably controlled aperture in the bottom of the vessel as a high solids, low viscosity slurry of calcium carbonate containing from about 70–78 percent by weight of calcium carbonate. In a preferred embodiment, about 74–76 percent by weight of calcium carbonate, about 0.8–1.2 percent by weight of dispersant, based upon the weight of dry calcium carbonate, and about 24–26 percent by weight of water are continuously and simultaneously metered into a high solids slurry containing the same ingredients in corresponding proportions under the conditions previously set forth. The process is effectively carried out at about ambient temperatures, and, preferably, at a temperature in the range of about 15–45° C. The rate of addition of ingredients and the rate of withdrawal of the finished slurry is that rate which maintains the body of slurry at approximately constant volume.

As will be noted from the drawing, the high solids calcium carbonate slurry, prepared at 75% solids on a continuous basis is somewhat dilatant. Upon adding water, and reducing the solids, it will be noted from the drawing that there is a significant reduction in viscosity of the calcium carbonate slurry. It is the latter slurries, the ones which have been made up at high solids and subsequently diluted with about 3–7 percent by weight of water, based upon the total weight of the slurry, which are highly beneficial from an economic standpoint in preparing a paper coating formulation. Thus, the most significant advantage accrue, insofar as these advantages are applicable to the paper coating art, when the slurries prepared in accordance with the method of the invention are subsequently reduced slightly in solids content by dilution with water. The principal advantage, of course, is that these high solids, low viscosity calcium carbonate slurries enable the preparation of high solids paper coatings without increasing the difficulty in handling such coatings. For example, the high solids, low viscosity slurries prepared in accordance with the method of the invention permit the preparation of a high solids paper coating which has a viscosity low enough such that it can be handled easily with respect to pumping, flow and ease of application onto the paper.

The high solids calcium carbonate slurries when prepared in accordance with the method of the invention and subsequently let down with about 3–7 percent by weight of water, based upon the total weight of the slurry, have excellent storage stability. These high solids, low viscosity pigment slurries can be stored for a week or more wthout significant settling of the calcium carbonate pigment as will be apparent from certain of the examples, hereinafter set forth.

The following examples further illustrate the method of the invention.

Example I 167 pounds of water and 5 pounds of the previously defined Calgon T dispersant were added to a vessel equipped with a Cowles rotating disc dissolver. The motor operating the disc was actuated and 500 pounds of calcium carbonate were slowly added to the vessel. To the 667 pounds of calcium carbonate slurry under continuous agitation in the mixing vessel there was added calcium carbonate at the rate of 750 pounds per hour, water at the rate of 250 pounds per hour and dispersant at the rate of 7.5 pounds per hour. A variable speed mechanical screw feeder was employed to convey the calcium carbonate from its source to the mixing vessel. The dispersant was added along with the water and the rate of flow was controlled by means of a rotameter. The Cowles dissolver was equipped with two rotating discs thereby establishing two hydraulic attrition zones in the mixing vessel. An adjustable valve at the bottom of the mixing vessel regulated the rate at which the slurry was withdrawn from the mixing vessel. A conduit from this valve led into a slurry letdown tank which was equipped with a portable agitator. The high solids calcium carbonate slurry prepared by adding calcium carbonate, water and dispersant at the rate set forth contained 75% solids. This 75% slurry was conveyed to the slurry letdown tank at the same rate at which the ingredients were added, thereby maintaining the slurry in the mixing vessel at approximately constant volume. Water was continuously metered into the slurry letdown tank in such quantity so as to dilute the 75% slurry to a slurry containing 70% calcium carbonate by weight. The viscosity of the 70% calcium carbonate slurry as determined by the Hercules high shear viscometer employing bob number 2 was $1.1 \times 10^{-5}$ dyne-centimeters at 1000 r.p.m. The Brookfield viscometer reading at 70% solids was estimated to be 150 centipoises at 30 r.p.m. A sample of the 75% solids calcium carbonate slurry was measured with the Hercules high shear viscometer employing bob number 2 and there was obtained a viscosity of $18 \times 10^{-5}$ dyne-centimeters at 400 r.p.m. The measurements made with the Hercules high shear viscometer at 70 and 75 percent solids are plotted in the drawing.

Example II 1283 grams of water and 30 grams of the previously defined Calgon T dispersant were added to a vessel equipped with a laboratory size Cowles dissolver. 3000 grams of calcium carbonate were slowly added to the agitated solution and there was obtained a slurry containing 70% solids. The Brookfield viscometer reading at 30 r.p.m. was 340 centipoises. The Hercules viscometer reading at 850 r.p.m. was $18 \times 10^{-5}$ dyne-centimeters. It will be noted that the viscosity of the calcium carbonate slurry in this example is substantially higher than the calcium carbonate slurry in Example I containing the same solids content. It is an advantage, therefore, to prepare the calcium carbonate slurries at a high solids content, such as 75% solids, and subsequently reduce the solids content to about 70% by adding water thereto.

Example III

This example illustrates that synthetic calcium carbonate pigments falling without the scope of U.S. patent application Serial No. 731,847 are unsuitable in the method of the invention. 2,268 grams of an acicular calcium carbonate having an average length of 0.34 micron and an average width of 0.11 micron were added to 1000 grams of water and 30 grams of Tamol 731 dispersant which were contained in a vessel equipped with a laboratory Cowles dissolver. There was obtained a slurry containing 69.4% solids which was diluted to 67.4% solids. The Brookfield viscometer reading at 30 r.p.m. was 560 centipoises. The Hercules viscometer reading at 500 r.p.m. was $18 \times 10^{-5}$ dyne-centimeters. It will be noted that a 75% calcium carbonate slurry could not be obtained with this synthetic pigment. In addition, it will be noted that the diluted slurry had a viscosity which was substantially higher than the slurries prepared in accordance with the method of the invention and subsequently diluted to about 70% solids. Tamol 731, the dispersant employed in this example, is the trade designation of an anionic dispersant classified as the sodium salt of a carboxylated polyelectrolyte.

Example IV

This example illustrates the excellent storage stability of slurries prepared at 75% solids and subsequently diluted to 70% solids.

A sample of the calcium carbonate slurry containing 75% solids and prepared in accordance with the procedure set forth in Example I was diluted, after two days' storage, to about 70% solids and Hercules viscosity measurements were made at the end of five, nine and twelve days. The viscosity measurements of the slurry as originally prepared, and at the end of the second, fifth, ninth and twelfth day, are set forth in the table below:

STORAGE STABILITY

| Days | Solids | Viscosity |
| --- | --- | --- |
| As prepared | 75.6 | $3.6 \times 10^{-5}$ dyne-centimeters. |
| 2 | 74.5 | $3.0 \times 10^{-5}$ dyne-centimeters. |
| 5 | 70.3 | $3.4 \times 10^{-5}$ dyne-centimeters. |
| 9 | 70.2 | $7.0 \times 10^{-5}$ dyne-centimeters. |
| 12 | 70.4 | $8.5 \times 10^{-5}$ dyne-centimeters. |

It will be noted from the table that the high solids, low viscosity slurries prepared in accordance with the method of the invention have excellent storage characteristics and can be stored for a week or more without a significant increase in viscosity.

Thus, the objects of this invention have been accomplished, namely, a continuous process has been provided for preparing a high solids, low viscosity, stable slurry of calcium carbonate which enables the preparation of a high solids paper coating without increasing the difficulty in handling such coating.

What is claimed is:

1. A continuous process for preparing a high solids, low viscosity slurry of calcium carbonate, which comprises: establishing within a body of aqueous slurry containing about 70-78 percent by weight of calcium carbonate and about 0.4-2.0 percent by weight of dispersant, at least one hydraulic attrition zone, imparting, thereby, intense turbulence, high kinetic energy and a velocity of at least about 1500 feet/minute to the slurry in said zone relative to the body of slurry, adding about 70-78 percent by weight of calcium carbonate, about 0.4-2.0 percent by weight of dispersant and about 22-30 percent by weight of water simultaneously to said zone and continuously removing therefrom a high solids, low viscosity slurry of calcium carbonate, said process being carried out at about ambient temperatures and at such rate as to maintain the body of slurry at approximately constant volume; said calcium carbonate being characterized in that it is a finely divided, relatively nonaggregated calcium carbonate having an apparent particle size within the range of about 0.05-0.30 micron as determined by electron micrographs; and said dispersant consisting of a homogeneous mixture of (a) from about 81-88 percent by weight of sodium phosphate glass having a molar ratio of sodium oxide/phophorous pentoxide of from about 0.9/1 to about 1.5/1, (b) from about 10% to about 15% by weight of zinc oxide and (c) from about 0.5-8.0 percent by weight of a compound selected from the group consisting of the salt and hydroxide of an alkali-metal selected from the group consisting of potassium and lithium, wherein the concentration of said dispersant is based upon the dry weight of calcium carbonate.

2. A process in accordance with claim 1 wherein the velocity imparted to the slurry in the hydraulic attrition zone is from about 2000 to about 2500 feet/minute.

3. A process in accordance with claim 1 wherein the addition step is carried out at a temperature between about 15-45° C.

4. A process in accordance with claim 1 wherein at least about one-half of the calcium carbonate has an apparent particle size from about 0.10-0.20 micron as determined from electron micrographs.

5. A process in accordance with claim 1 wherein the body of slurry contains about 74-76 percent by weight of calcium carbonate and about 0.8-1.2 percent by weight of dispersant and the ingredients simultaneously added thereto are in the proportions of about 74-76 percent by weight of calcium carbonate, about 0.8-1.2 percent by weight of dispersant and about 24-26 percent by weight of water.

6. A continuous process for preparing a high solids, low viscosity slurry of calcium carbonate, which comprises: establishing within a body of aqueous slurry containing about 74-76 percent by weight of calcium carbonate and about 0.8-1.2 percent by weight of dispersant two contiguous hydraulic attrition zones, imparting, thereby, intense turbulence, high kinetic energy and a velocity of at least 2000 feet/minute to the slurry in said zones relative to the body of slurry, adding about 74-76 percent by weight of calcium carbonate, about 0.8-1.2 percent by weight of dispersant and about 24-26 percent by weight of water simultaneously thereto and continuously removing therefrom a high solids, low viscosity slurry of calcium carbonate, said process being carried out at a temperature in the range of about 15-45° C. and at such rate as to maintain the body of slurry at approximately constant volume; said calcium carbonate being characterized in that it is a finely divided, relatively nonaggregated calcium carbonate in which at least about one-half of the calcium carbonate particles have an apparent particle size within the range of about 0.10-0.20 micron as determined from electron micrographs; and said dispersant consisting of a fused, homogeneous mixture of (a) from about 81% to about 88% by weight of sodium phosphate glass having a molar ratio of sodium oxide to phosphoric pentoxide of from about 0.9/1 to about 1.5/1, (b) from about 10% to about 15% by weight of zinc oxide and (c) from about 0.5 to about 8.0 percent by weight of a compound selected from the group consisting of the salt and hydroxide of an alkali metal selected from the group consisting of potassium and lithium, wherein the concentration of said dispersant is based upon the dry weight of calcium carbonate.

7. A process in accordance with claim 6 wherein the high solids slurry discharged from the hydraulic attrition zone is dilute with about 3-7 percent by weight of water, based upon the total weight of the slurry.

8. A continuous process for preparing a high solids, low viscosity slurry of calcium carbonate which comprises: (1) establishing a vortical hydraulic attrition zone within a body of aqueous slurry containing about 70-78 percent by weight of calcium carbonate and about 0.4-2.0 percent by weight of dispersant; (2) adding about 70-78 percent by weight of calcium carbonate, about 0.4-2.0 percent by weight of dispersant and about 22-30 percent by weight of water simultaneously to the vortex within said zone; (3) passing the resulting mixture through said zone, and (4) continuously removing therefrom a high solids, low viscosity slurry of calcium carbonate, said process being carried out at about ambient temperatures and at such rate as to maintain the body of slurry at approximately constant volume; said calcium carbonate being characterized in that it is a finely divided, relatively nonaggregated calcium carbonate having an apparent particle size within the range of about 0.05-0.30 micron as determined by electron micrographs; and said dispersant consisting of a homogeneous mixture of (a) from about 81-88 percent by weight of sodium phosphate glass having a molar ratio of sodium oxide/phosphorous pentoxide of from about 0.9/1 to about 1.5/1, (b) from about 10% to about 15% by weight of zinc oxide, and (c) from about 0.5-8.0 percent by weight of a compound selected from the group consisting of the salt and hydroxide of an alkali metal selected from the group consisting of potassium and lithium, wherein the concentration of said dispersant is based upon the dry weight of calcium carbonate.

9. A process in accordance with claim 8 wherein the high solids slurry discharged from the vortical hydraulic attrition zone is diluted with about 3–7 percent water, based upon the total weight of the slurry.

References Cited in the file of this patent

UNITED STATES PATENTS

| | | |
|---|---|---|
| 2,383,509 | Rafton | Aug. 28, 1945 |
| 2,385,379 | Rafton | Sept. 25, 1945 |
| 2,397,035 | Mowlds | Mar. 19, 1946 |
| 2,435,600 | Rafton | Feb. 10, 1948 |
| 2,447,532 | Rafton | Aug. 24, 1948 |
| 2,915,412 | Lyons | Dec. 1, 1959 |